(12) United States Patent
Tassy, Sr.

(10) Patent No.: US 9,961,908 B2
(45) Date of Patent: May 8, 2018

(54) APPARATUS FOR APPLYING PARTICULATE MATTER TO A SUBSTRATE

(71) Applicant: Tomas Tassy, Sr., Roselle, IL (US)

(72) Inventor: Tomas Tassy, Sr., Roselle, IL (US)

( * ) Notice: Subject to any disclaimer, the term of this patent is extended or adjusted under 35 U.S.C. 154(b) by 0 days. days.

(21) Appl. No.: 15/092,497

(22) Filed: Apr. 6, 2016

(65) Prior Publication Data

US 2016/0288144 A1 Oct. 6, 2016

Related U.S. Application Data

(60) Provisional application No. 62/143,594, filed on Apr. 6, 2015.

(51) Int. Cl.
| | |
|---|---|
| B05C 19/04 | (2006.01) |
| A21C 9/08 | (2006.01) |
| A23P 20/12 | (2016.01) |
| A21C 9/04 | (2006.01) |

(52) U.S. Cl.
CPC ............... *A21C 9/08* (2013.01); *A21C 9/04* (2013.01); *A23P 20/12* (2016.08); *B05C 19/04* (2013.01)

(58) Field of Classification Search
None
See application file for complete search history.

(56) References Cited

U.S. PATENT DOCUMENTS

| | | | | |
|---|---|---|---|---|
| 2,467,097 | A | * | 4/1949 | Rooney, Jr. ............. B05C 19/04 118/308 |
| 5,078,090 | A | * | 1/1992 | Richman ................. A21C 9/04 118/13 |
| 5,529,434 | A | * | 6/1996 | Swisher, Jr. ............ E01C 19/48 404/108 |

* cited by examiner

*Primary Examiner* — Jethro M Pence
(74) *Attorney, Agent, or Firm* — Barnes & Thornburg LLP; Mark J. Nahnsen (57) ABSTRACT

A particulate duster system includes a duster used to apply particulate matter to a food product moving along a conveyor positioned beneath the duster. The duster is used to uniformly dispense particulate matter onto a moving product conveyor for carrying a food product to be dusted.

10 Claims, 8 Drawing Sheets

APPARATUS FOR APPLYING PARTICULATE MATTER TO A SUBSTRATE

PRIORITY CLAIM

This application claims priority from to U.S. Provisional Application Ser. No. 62/143,594, filed Apr. 6, 2015, which is expressly incorporated herein by reference in its entirety.

BACKGROUND

The present disclosure relates to dusters, and particularly to particulate dusters used to apply particulate material to a substrate. More particularly, the present disclosure relates to devices have for handling and dispensing dry particulate materials, such as flour, sugar and grain. For example, U.S. Pat. No. 2,905,365 discloses a dispenser with a hopper having a vibrating screen therein. U.S. Pat. No. 2,633,242 discloses a flour duster including an outer housing open at the bottom with a perforated screen plate forming the bottom wall of the hopper. U.S. Pat. No. 2,390,195 discloses a flour duster including a curved bottom screen with an agitator bar and rotating brush therein. U.S. Pat. No. 2,323,864 discloses a vibratory feeder including a vibrating hopper and vibrating tray. U.S. Pat. No. 2,066,899 discloses a flour dusting mechanism including a hopper having a perforate bottom and an agitator mechanism. U.S. Pat. No. 1,926,903 discloses a sifter mechanism having a stationary hopper with rocking agitators comprised of longitudinal rods therein. U.S. Pat. No. 1,537,123 discloses a dry feeding machine having a vibrating hopper section with rotating agitator means therein. U.S. Pat. No. 1,181,208 discloses a candy starching device with a vibrating screen sifter and a rotating assembly within the hopper. U.S. Pat. No. 311,904 discloses a grain separator and cleaner with a vibrating screen assembly. U.S. Pat. No. 52,693 discloses a drug and spice sifter including a curved screen and rotating assembly therein, and U.S. Pat. No. 44,785 discloses a plaster and seed sower including a dual-chamber hopper with rotating devices in each chamber.

The above-described devices are typically refilled by hand. Because of this, filling prior art devices causes the unwanted spread of particulate matter around the equipment creating a potentially hazardous condition.

Accordingly, there remains a need in the art for a method and apparatus for uniformly dispensing particulate materials on a substrate without causing the unwanted distribution of such materials when filling the apparatus.

SUMMARY

A particulate duster system in accordance with the present disclosure includes a duster used to apply particulate matter to a food product moving along a conveyor positioned beneath the duster.

In illustrative embodiments, the duster is used to uniformly dispense particulate matter onto a moving product conveyor for carrying a food product to be dusted. The duster includes a particulate applicator, a particulate sifter assembly, positioned above the particulate applicator and a particulate auger assembly, positioned above the particulate sifter. The particulate applicator includes a housing in the form of an elongate trough. The trough includes an open top and a series of openings at the bottom adapted to accept a series of rubber discs. The discs are rotated with an electric motor so that the discs rotate with respect to the housing. Rotation of the rubber discs causes the creation of a static charge such that particulate matter within the housing is attracted to the wheels and then the wheels deposit the particulate matter below the housing.

In illustrative embodiments, the particulate sifter assembly includes a housing that contains a horizontal sifter plate that is formed to include a series of apertures that permit particulate matter to pass there through. The sifter plate is couple to an electric motor that causes the sifter plate to slide back and forth in a horizontal plane with respect to a fixed plate with apertures within the housing. Means are provided for controlling the oscillation speed of the sifter plate within the housing to control the amount of material that is deposited into the particulate applicator.

In illustrative embodiments, the particulate auger assembly includes a housing that is provided with a centralized upper opening that is configured to accept particulate matter there through. The housing also includes an elongated curved bottom wall. The bottom wall includes a series of apertures configured to let particulate matter to pass there through. The housing of the particulate auger assembly includes a rotatable auger having first and second auger halves that have helical flights. The helical flight on the first auger half is a clockwise flight and the helical flight on the second auger half is a counterclockwise flight so that rotation of the auger causes the flights to distribute particulate matter that enters through the centralized upper opening along the length of the housing. Rotation of the auger causes particulate matter to pass through the series of apertures in the bottom wall.

The combination of the particulate auger assembly, the particulate sifter assembly and the particulate applicator allows particulate matter, such as flour or sugar, to be deposited into the centralized opening of the particulate auger assembly and to be evenly and uniformly distributed onto an object or objects being conveyed beneath the duster. The duster is designed to be secured above a conveyor and can be used alone or in combination with several duster units all of which can be coupled to a particulate matter transfer system. The particulate matter transfer system includes one or more particulate matter storage containers that are coupled to the dusters by use of distribution ductwork. Vacuum/blowers are coupled to each duster to draw particulate matter from the storage container(s) to the duster. Particulate matter exits the blower into the centralized upper opening of the particulate auger assembly where it is spread evenly by the particulate auger assembly into the particulate sifter assembly. The oscillation of the sifter plate separates the particles of the particulate matter and deposits them into the particulate applicator, which, in turn, deposits the particulate matter onto the moving conveyor.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of the particulate duster showing the particulate applicator, the particulate sifter assembly coupled to and positioned above the particulate applicator and the particulate auger assembly coupled to and positioned above the particulate sifter assembly, the particulate applicator, the particulate sifter assembly and the particulate auger assembly each driven by a separate drive means.

DETAILED DESCRIPTION

While the present disclosure may be susceptible to embodiment in different forms, there are shown in the drawings, and herein will be described in detail, embodiments with the understanding that the present description is to be considered an exemplification of the principles of the disclosure and is not intended to limit the disclosure to the details of construction and the arrangements of components set forth in the follow description or illustrated in the drawings.

Figure 1:
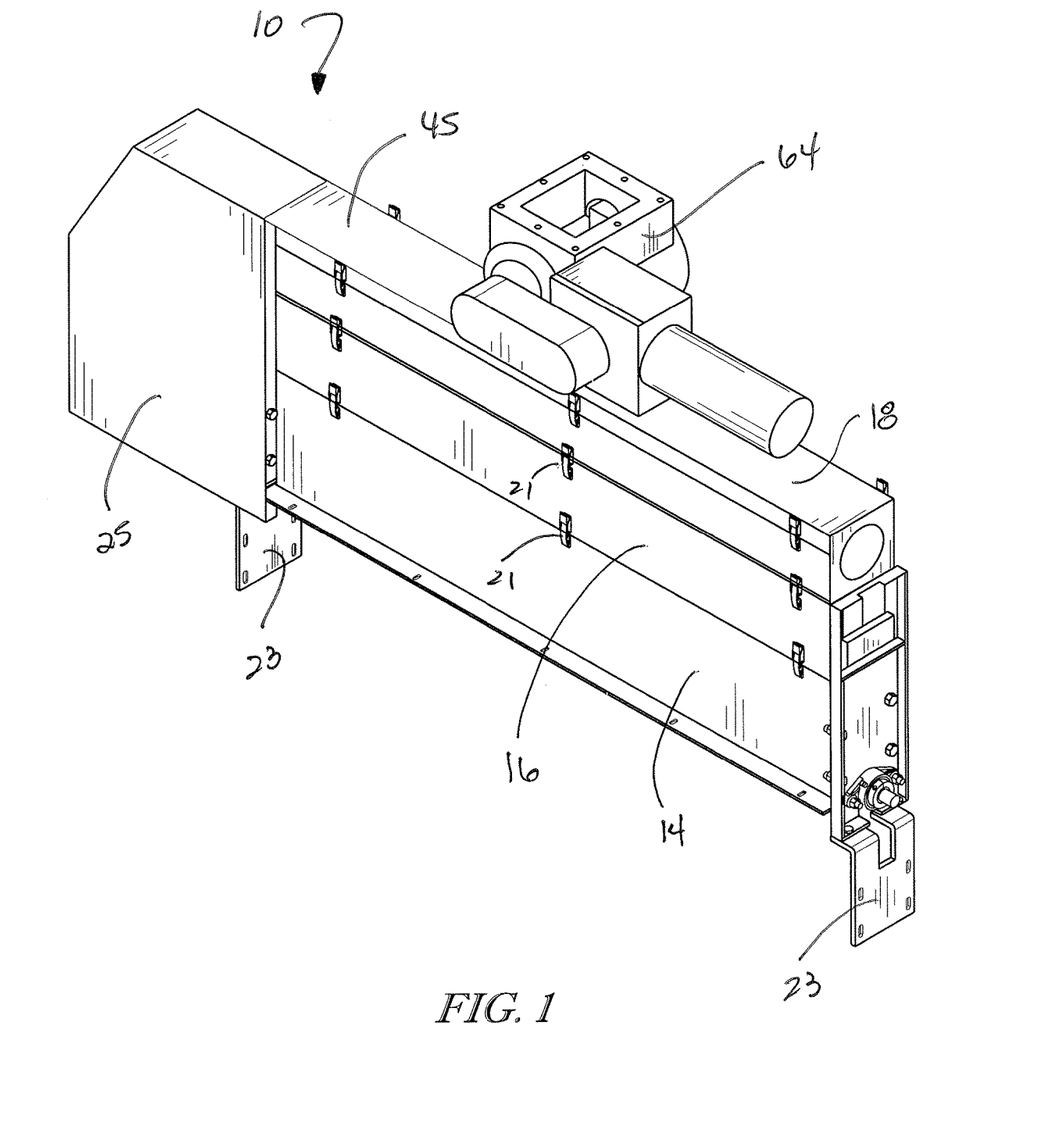
Figure 2:
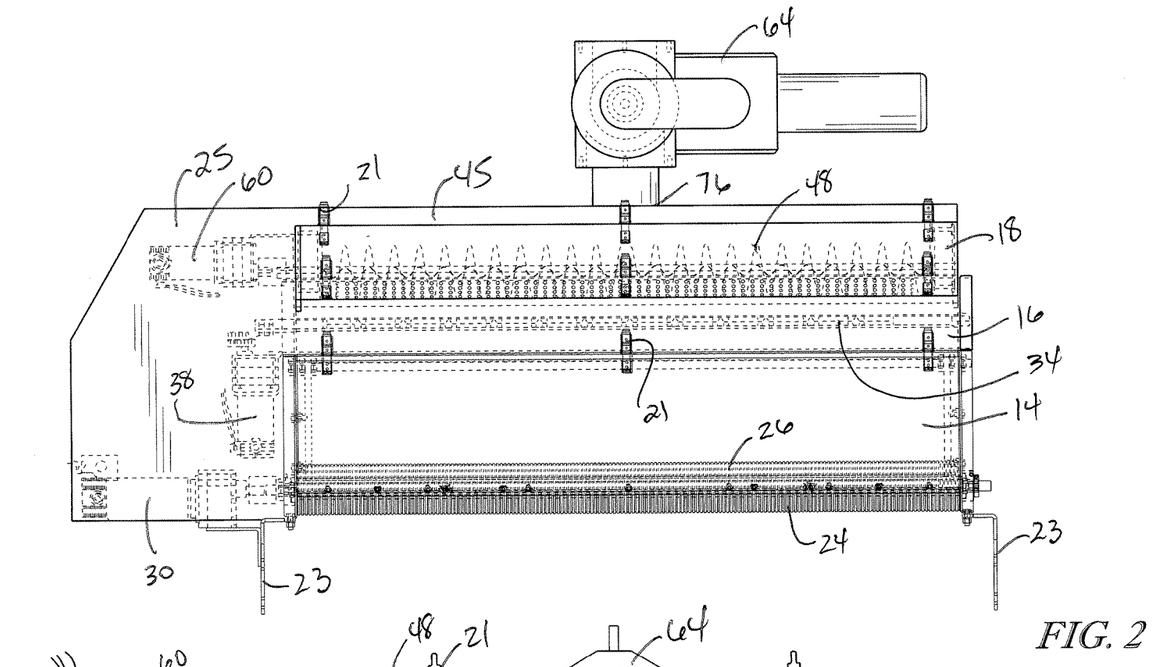
FIG. 2 is a side elevational view of the particulate duster showing the particulate applicator at the bottom, the particulate sifter assembly and the particulate auger assembly.
Figure 3:
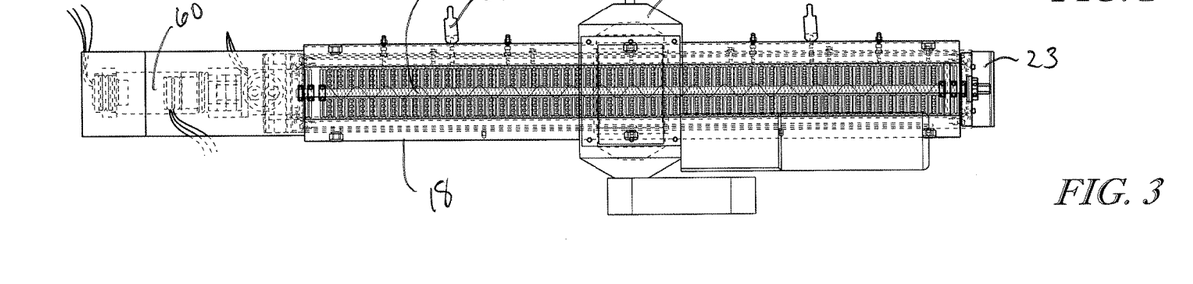
FIG. 3 is a top elevational view of FIG. 1.
Figure 13:
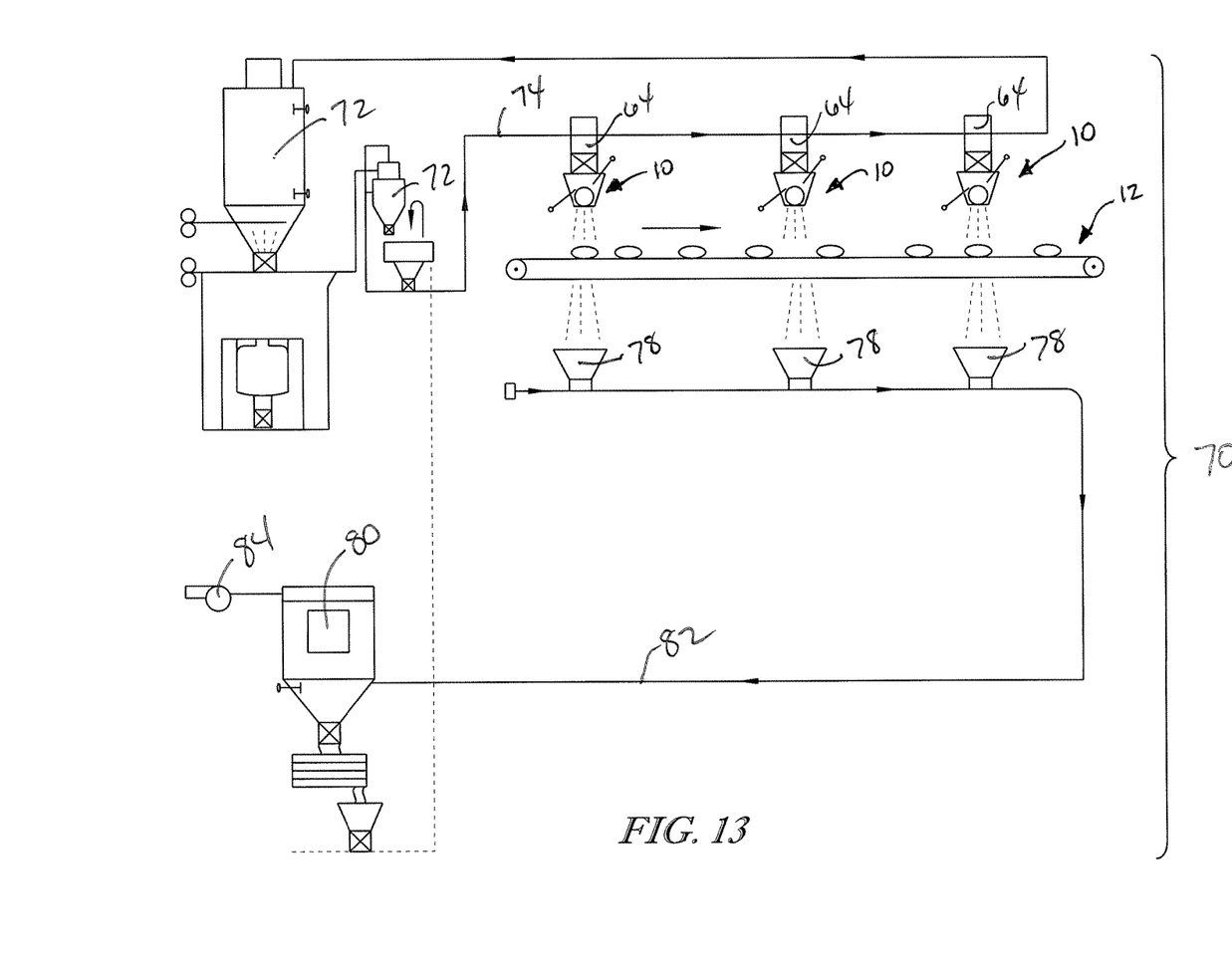
FIG. 13 is a process diagram showing the use of three particulate dusters that are coupled to a particulate matter silo and showing three reclamation units for reclaiming the unused particulate matter deposited by the particulate dusters.

A particulate duster system in accordance with the present disclosure includes a duster 10 used to apply particulate matter to a food product moving along a conveyor 12 positioned beneath the duster, a shown in FIGS. 1 and 13. Duster 10 is used to uniformly dispense particulate matter onto a moving product conveyor 12 for carrying a food product to be dusted. Duster 10 includes a particulate applicator 14, a particulate sifter assembly 16, positioned above the particulate applicator 14 and a particulate auger assembly 18, positioned above particulate sifter assembly 16, as shown in FIG. 1.

The particulate applicator 14, particulate sifter 16 and particulate auger assembly 18 are interconnected with the particulate auger assembly 18 on top, the particulate sifter 16 positioned between the particulate auger assembly 18 and the particulate applicator 14. This arrangement allows for the even application of a granular material, such as flour or sugar to be applied to an item(s) conveyed beneath on conveyor 12. The particulate applicator 14, particulate sifter 16 and particulate auger assembly 18 are coupled together with fasteners 21, which allow the three units to be separated for maintenance and cleaning. Duster 10 includes brackets 23, which allow duster 10 to be coupled to the conveyor 12. Drive motors for the particulate applicator 14, particulate rake 16 and particulate auger assembly 18 are enclosed in a shroud 25, which protects the motors and electronics from particulate matter.

Figure 4:
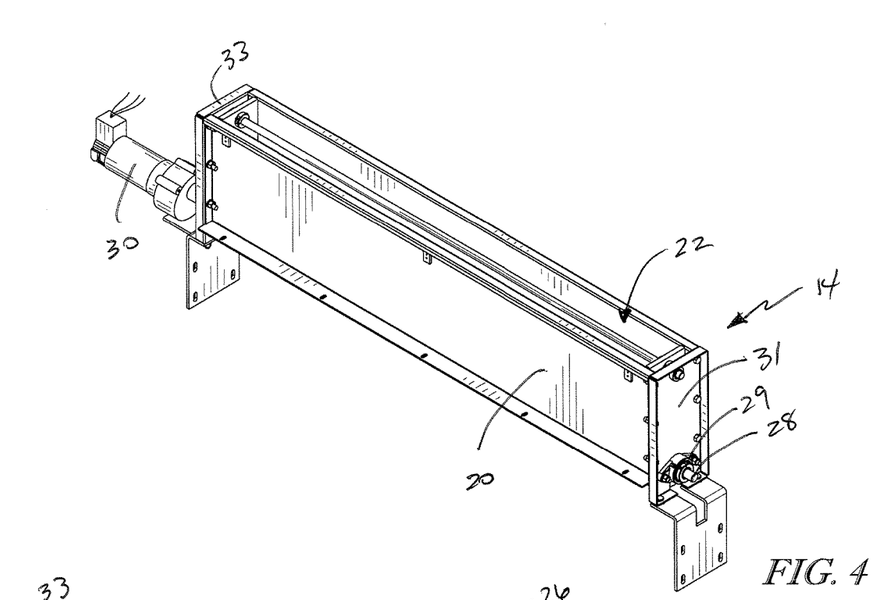
FIG. 4 is a perspective view of the particulate applicator.
Figure 5:
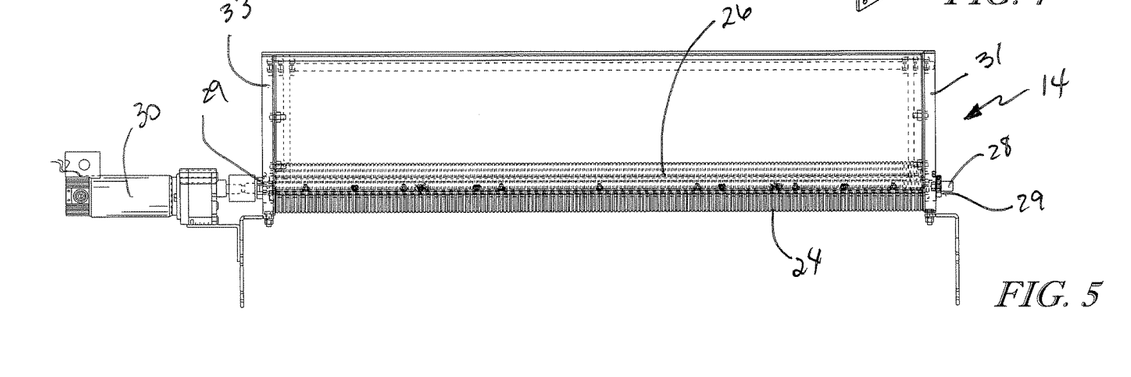
FIG. 5 is a side elevational view of the particulate applicator.
Figures 6, 7:
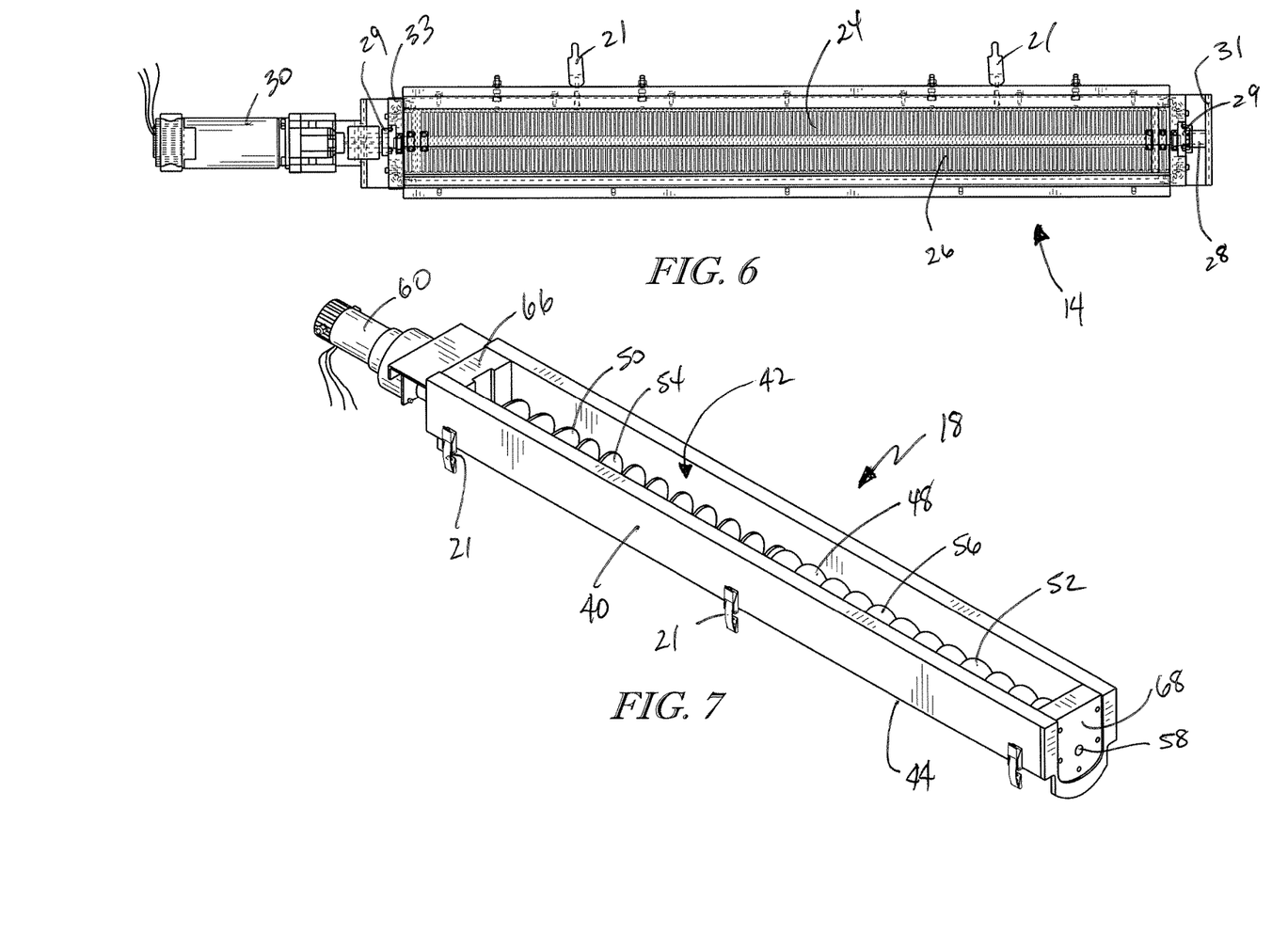
FIG. 6 is a top elevational view of the particulate applicator.
FIG. 7 is a perspective view of the particulate auger assembly.

Particulate applicator 14 includes a housing 20 in the form of an elongated trough as shown in FIGS. 4-6. Housing 20 is formed to include an upper opening 22 and a series of elongated slits 24 at the bottom adapted to accept a series of rubber discs 26 mounted on a shaft 28. Shaft 28 is supported at its ends by use of bearings 29 secured to end caps 31, 33 of housing 20 Discs 26 are rotated when an electric motor 30 drives shaft 28 through use of a transmission and coupling arrangement so that the discs 26 rotate with respect to the housing 20. A portion of the discs 26 are positioned within the elongated slits 24 formed at the bottom of the housing. Rotation of the rubber discs 26 causes the creation of a static charge. The static charge attracts the particulate matter positioned within the housing 20 which sticks to the discs 26. Rotation of the discs 26 causes the particulate matter to be deposited below the housing 20 where it is uniformly dropped on food items moving underneath the duster 10 on conveyor 12.

Figure 10:
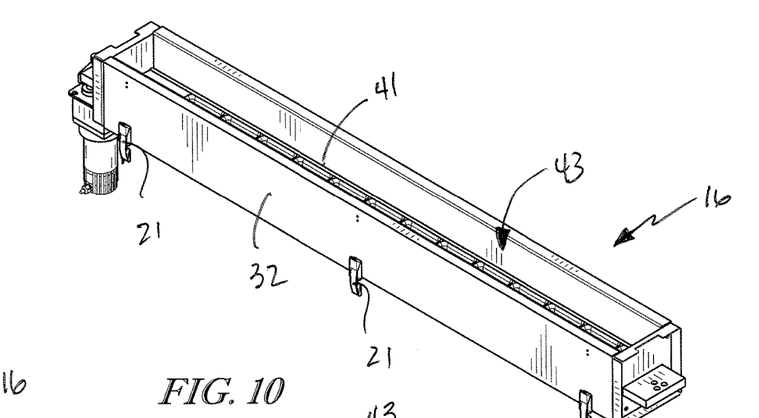
FIG. 10 is a perspective view of the particulate sifter assembly showing a sifter plate positioned within a housing.
Figure 11:
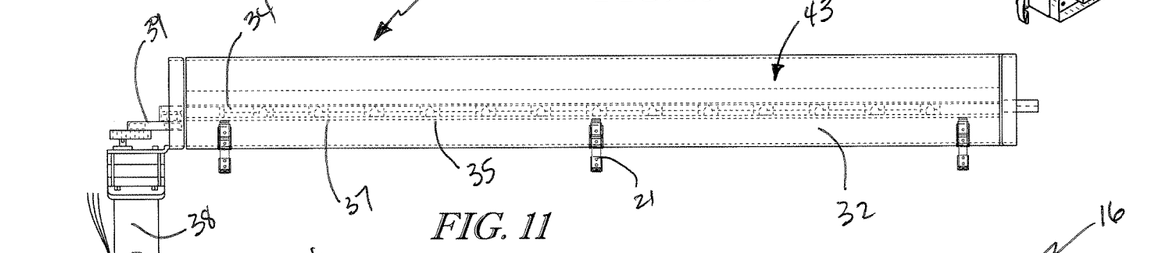
FIG. 11 is a side elevational view of the particulate sifter assembly.
Figure 12:
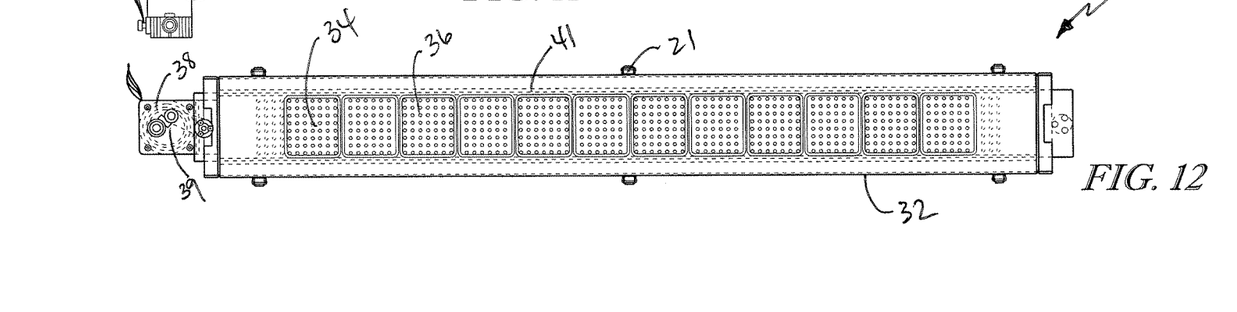
FIG. 12 is a top elevational view of the particulate sifter assembly.

Particulate sifter assembly 16 is positioned above the particulate applicator 14 and below the particulate auger assembly 18 and is secured by use of fasteners 21, as shown in FIGS. 1 and 10-12. Particulate sifter assembly 16 includes a housing 32 that is formed to include an upper opening 43 that is adapted to accept particulate matter from the particulate auger assembly 18. Housing 32 of particulate sifter assembly 16 contains an upper sifter plate 34 that is formed to include a series of apertures 36 that permit particulate matter to pass there through as shown in FIGS. 10-12. Particulate sifter assembly 16 also includes a lower sifter plate 35 positioned below upper sifter plate 34. Lower sifter plate 35 also includes a plurality of a apertures 37 that are adapted to permit the passage of particulate matter. Housing 32 of particulate sifter assembly 16 is coupled to housing 20 of particulate applicator 14. Upper sifter plate 34 is couple to an electric motor 38, through use of an eccentric and pivot arm arrangement 39, which causes the upper sifter plate 34 to slide back and forth in a horizontal plane within the housing 32 as the motor 38 is rotated.

Upper sifter plate 34 slides within track members 41, which maintain the vertical orientation of the upper shifter plate 34. Means, such as a control board having a central processing unit CPU, are provided to control the oscillation speed of the upper sifter plate 34 within the housing 32 to control the amount of particulate material that is deposited into the particulate applicator 14. Particulate sifter assembly 16 finely sifts the particulate matter coming from the particulate auger assembly 18. Sifted flour, which is much lighter than unsifted flour, is easier to mix into other ingredients when forming a cake batter or making dough. When flour is sifted with other dry ingredients, such as cocoa powder, this helps to combine them evenly before they are mixed with other ingredients.

Particulate auger assembly 18 is positioned above particulate sifter assembly 16 and includes a housing 40 that is formed to include an upper opening 42 that is configured to accept particulate matter there through as shown in FIGS. 7-9. Opening 42 is closed by cover 45. Cover 45 includes a central opening and is adapted to accept the coupling of blower unit 64, which adds particulate matter, such as flour or sugar to duster 10 as discussed further below. The housing 40 also includes an elongated curved bottom wall 44. The bottom wall 44 includes a series of apertures 46 configured to let particulate matter to pass there through. The housing 40 of the particulate auger assembly 18 includes rotatable auger 48 having first and second auger halves 50, 52 that have helical flights 54, 56.

Figure 8:
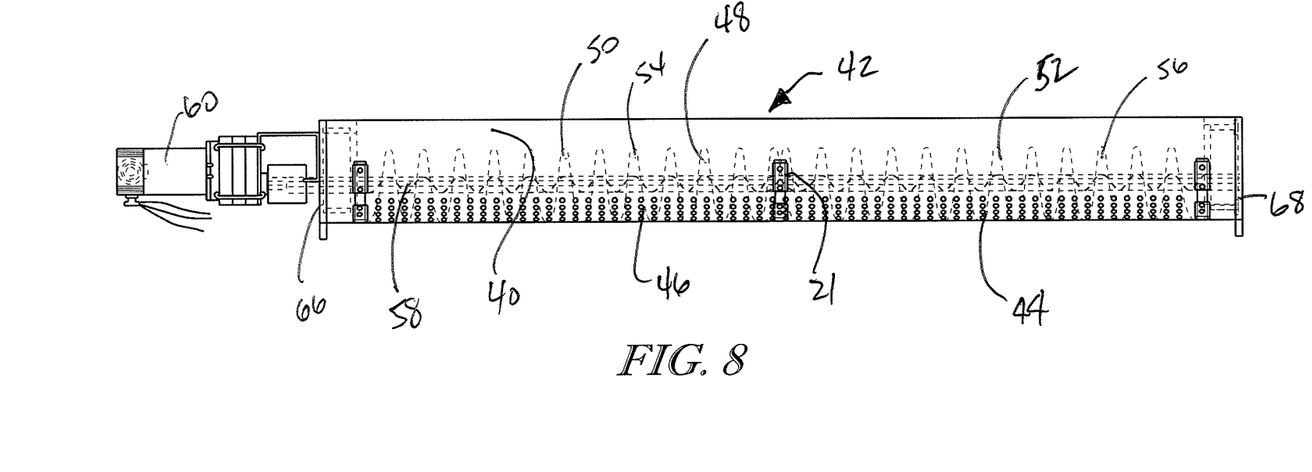
FIG. 8 is a side elevational view of the particulate auger assembly.
Figure 9:
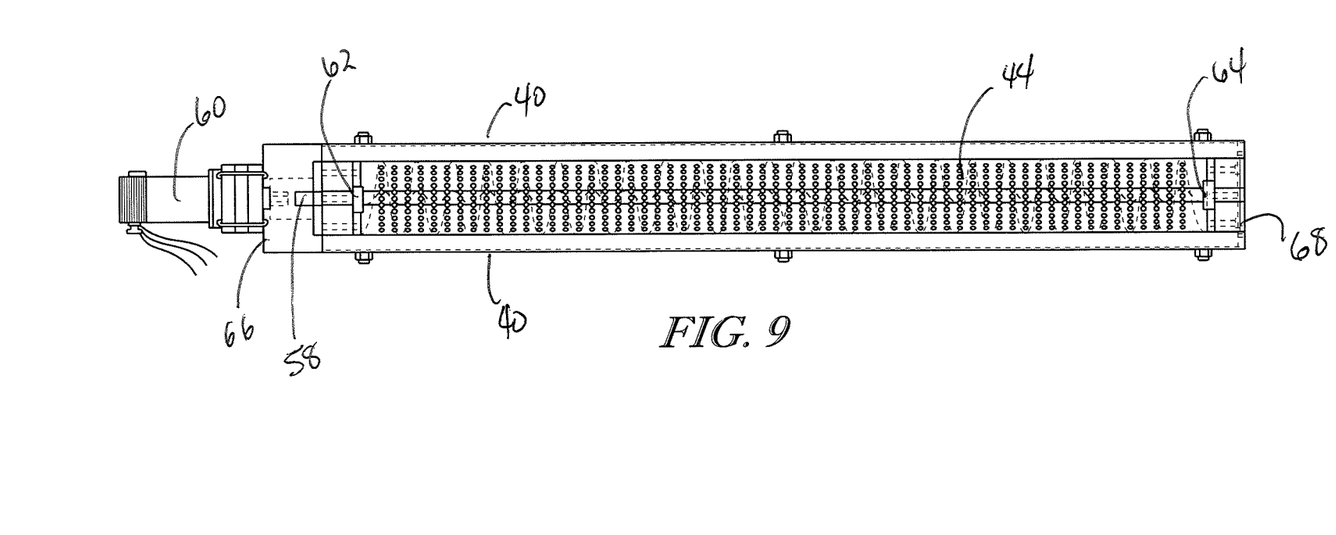
FIG. 9 is a top elevational view of the particulate auger assembly.

The helical flight 54 on the first auger half 50 is a clockwise flight and the helical flight 56 on the second auger half 52 is a counterclockwise flight so that rotation of the auger causes the flights to distribute particulate matter that enters through the centralized upper opening 42 along the length of the housing 40. Rotation of the auger 48 causes particulate matter to pass through the series of apertures 46 in the bottom wall 44. While a central opening is shown, the opening could be located at one end and auger 48 can be a single flight that conveys particulate matter from a first end to a second end along the length of the housing 40.

Auger 48 is rotated by shaft 58 that is rotated by electric motor 60 and supported by bearings 62, 64 secured to end walls 66, 68 of housing 40. Electric motors 30, 38 and 60 can be stepper motors and are controlled by the electronic controller so the amount of particulate matter from each stage can be precisely controlled so that the appropriate amount of particulate matter is deposited into each housing so that they do not overflow or back up.

The combination of the particulate auger assembly 18, the particulate sifter assembly 16 and the particulate applicator 14 allows particulate matter, such as flour or sugar, to be deposited into the centralized opening 42 of the particulate auger assembly 18 and to be evenly and uniformly distributed onto an object or objects being conveyed beneath the duster 10. The combination of the particulate auger assembly 18, the particulate sifter assembly 16 and the particulate applicator 14 causes even distribution of particulate matter across the entire length of the duster 10 to evenly deposition particulate matter across the entire width of the conveyor belt 12.

The duster 10 is designed to be secured above conveyor 12 by use of brackets 23 or other means and can be used alone or in combination with several duster units 10 all of which can be coupled to a particulate matter transfer system 70 as shown in FIG. 13. The system can be used with one conveyor line or multiple conveyor lines. The particulate matter transfer system 70 includes one or more particulate matter storage containers 72 that are coupled to the dusters 10 by use of distribution ductwork 74. Vacuum/blowers 64 are coupled to each duster 10 to draw particulate matter from the storage container(s) 72 to the dusters 10.

Particulate matter exits the blower 64 into the upper opening 42 of the particulate auger assembly 18 through central opening 76 in cover 45 where it is spread evenly by the particulate auger assembly 18 into the particulate sifter assembly 16. The horizontal movement of the sifter plate 34 separates the particles of the particulate matter and deposits them into the particulate applicator 14, which, in turn, deposits the particulate matter onto the moving conveyor 12. Vacuum units 78 can be positioned below conveyor 12 to gather the unused particulate matter and transfer to return container 80 by use of return line 82.

Figure 14:
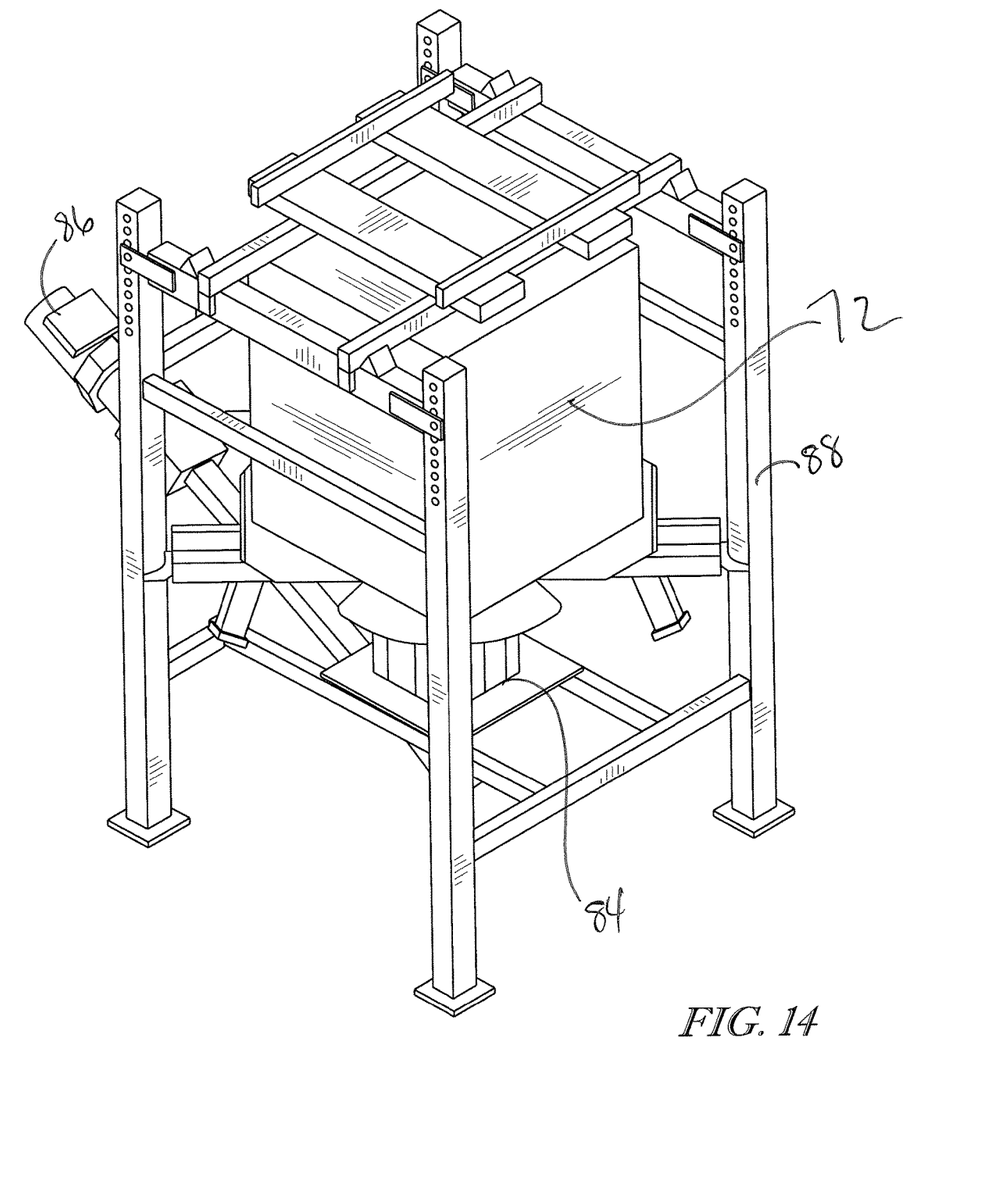
FIG. 14 is a perspective view of a bulk handling storage tank.

Vacuum/blower motor 84 provides suction to the vacuum units 78 to collect the particulate matter. Storage container 72 includes a valve mechanism 84 driven by motor 86. Storage container 72 can be supported by frame structure 88 to suspend storage container 72. Storage container 72 allows the particulate matter to be stored in bulk and distributed to dusters 10 by use of the vacuum/blowers 64.

While embodiments have been illustrated and described in the drawings and foregoing description, such illustrations and description are considered to be exemplary and not restrictive in character, it being understood that only illustrative embodiments have been shown and described and that all changes and modifications that come within the spirit of the disclosure are desired to be protected. The applicants have provided description and figures which are intended as illustrations of embodiments of the disclosure, and are not intended to be construed as constraining or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure.

What is claimed is:

1. An apparatus for applying a particulate matter to a substrate comprising:
   an inlet opening configured to receive the particulate matter;
   a horizontally oriented particulate auger assembly having a horizontal auger housing provided with a horizontally oriented auger, wherein the horizontally oriented auger includes a first horizontally oriented auger half and a second horizontally oriented auger half, wherein the first horizontally oriented auger half includes a first helical flight that conveys the particulate matter in a first direction and the second horizontally oriented auger half includes a second helical flight that coveys the particulate matter in a second direction, the horizontally oriented auger adapted to convey the particulate matter received from the inlet opening at a center portion of the horizontally oriented particulate auger assembly outwardly along at least a portion of a length of the horizontal auger housing and deposit the particulate matter beneath the horizontal auger housing, the horizontal auger housing including a curved bottom wall formed to include a plurality of apertures adapted to permit the particulate matter conveyed by the horizontally oriented auger to exit below the horizontal auger housing;
   a particulate sifter assembly positioned beneath the horizontally oriented particulate auger assembly, the particulate sifter assembly including a sifter housing and an upper sifter plate and a lower sifter plate positioned within the sifter housing, wherein at least one of the upper sifter plate and the lower sifter plate moves with respect to the other of the upper sifter plate and the lower sifter plate to sift the particulate matter received from the horizontally oriented particulate auger assembly and release the particulate matter beneath the sifter housing; and
   a particulate applicator assembly positioned beneath the particulate sifter assembly, the particulate applicator assembly having an applicator housing that includes a plurality of rotating discs, the applicator housing further including a series of openings, wherein a rotation of the rotating discs causes the particulate matter received from the particulate sifter assembly to be deposited below the particulate applicator assembly onto the substrate.

2. The apparatus of claim 1, wherein the horizontally oriented auger is coupled to an electric motor to drive the horizontally oriented auger.

3. The apparatus of claim 2, wherein the horizontal auger housing includes a cover with a central opening, the central opening adapted to accept the particulate matter at a center of the horizontal auger housing.

4. The apparatus of claim 1, wherein at least one of the upper sifter plate and the lower sifter plate is coupled to a motor and an eccentric to reciprocate the at least one of the upper sifter plate and the lower sifter plate along a horizontal plane.

5. The apparatus of claim 1, wherein the rotating discs are coupled to a shaft rotated by a motor.

6. The apparatus of claim 5, wherein the rotating discs are made from a rubber.

7. The apparatus of claim 1, wherein the horizontal auger housing, the sifter housing and the applicator housing are coupled by fasteners that permit a separation of the horizontal auger housing, the sifter housing and the applicator housing.

8. The apparatus of claim 1, wherein the horizontally oriented auger, at least one of the upper sifter plate and the lower sifter plate, and the rotating discs are each driven by a separate electric motor.

9. The apparatus of claim 8, wherein each of the separate electric motors are independently controllable by a control panel to control an amount of the particulate matter that is dispensed from each of the horizontal auger housing, the sifter housing and the applicator housing.

10. An apparatus for applying a particulate matter to a substrate comprising:

an inlet opening configured to receive the particulate matter;

a horizontally oriented particulate auger assembly having a horizontal auger housing provided with a horizontally oriented auger, wherein the horizontally oriented auger includes a first horizontally oriented auger half and a second horizontally oriented auger half, wherein the first horizontally oriented auger half includes a first helical flight that conveys the particulate matter in a first direction and the second horizontally oriented auger half includes a second helical flight that coveys the particulate matter in a second direction, the horizontally oriented auger adapted to convey the particulate matter received from the inlet opening at a center portion of the horizontally oriented particulate auger assembly outwardly along at least a portion of a length of the horizontal auger housing and deposit the particulate matter beneath the horizontal auger housing, the horizontal auger housing including a curved bottom wall formed to include a plurality of apertures adapted to permit the particulate matter conveyed by the horizontally oriented auger to exit below the horizontal auger housing; and a particulate sifter assembly positioned beneath the horizontally oriented particulate auger assembly, the particulate sifter assembly including a sifter housing and an upper sifter plate and a lower sifter plate positioned within the sifter housing, wherein at least one of the upper sifter plate and the lower sifter plate moves with respect to the other of the upper sifter plate and the lower sifter plate to sift the particulate matter received from the horizontally oriented particulate auger assembly and release the particulate matter beneath the sifter housing.

* * * * *